United States Patent
Stafford et al.

[15] 3,669,914

[45] June 13, 1972

[54] PROCESS FOR PREPARING VINYLIDENE CHLORIDE POLYMERS

[72] Inventors: Owen L. Stafford, Midland; Robert K. Tarzwell, Beaverton, both of Mich.

[73] Assignee: The Dow Chemical Company, Midland, Mich.

[22] Filed: Aug. 13, 1970

[21] Appl. No.: 63,656

Related U.S. Application Data

[63] Continuation of Ser. No. 813,343, April 3, 1969, abandoned, which is a continuation-in-part of Ser. No. 620,217, March 1, 1967, which is a continuation-in-part of Ser. No. 329,992, Dec. 12, 1963, abandoned.

[52] U.S. Cl.............260/17 R, 260/29.6 MQ, 260/29.6 MM, 260/29.6 TA, 260/29.6 T, 260/80.72, 260/85.5 XA, 260/85.5 M, 260/85.5 F, 260/87.7, 260/91.7, 260/92.8 W
[51] Int. Cl............................................C08f 1/13, C08f 3/28
[58] Field of Search.................260/80.72, 85.5 XA, 85.5 M, 260/85.5 F, 87.7, 91.7, 92.8 W, 17 R, 29.6 MQ, 29.6 MM, 29.6 TA, 29.6 T

[56] References Cited

UNITED STATES PATENTS

| | | | |
|---|---|---|---|
| 2,160,934 | 6/1939 | Wiley | 260/92.8 |
| 2,538,051 | 1/1951 | Schick | 260/85.5 M |
| 3,205,204 | 9/1965 | Heckmaier et al | 260/87.1 |
| 3,235,525 | 2/1966 | Woodard | 260/29.6 MQ |
| 3,248,374 | 4/1966 | Covington | 260/78.5 CL |

*Primary Examiner*—William H. Short
*Assistant Examiner*—L. M. Phynes
*Attorney*—Griswold & Burdick, Albin R. Lindstrom and Ronald B. Brookens

[57] ABSTRACT

This invention is concerned with a process for polymerizing vinylidene chloride monomer in a modified emulsion polymerization system to produce readily isolatable, particulate, high density polymer at a rate significantly faster than achieved by conventional suspension type polymerization. The process utilizes an oil phase of vinylidene chloride monomer dispersed in an aqueous phase containing certain water-soluble, free-radical polymerization catalyst, cellulose ethers, wetting agents and coagulants.

3 Claims, No Drawings

PROCESS FOR PREPARING VINYLIDENE CHLORIDE POLYMERS

This application is a streamline continuation of the now abandoned application Ser. No. 813,343, filed Apr. 3, 1969, which in turn is a continuation-in-part of copending application Ser. No. 620,217, filed Mar. 1, 1967, which is in turn a continuation-in-part of copending application Ser. No. 329,992, filed Dec. 12, 1963 (now abandoned).

Processes for the polymerization of monomeric vinylidene chloride in aqueous emulsion or in non-emulsified aqueous suspension and for the polymerization of vinylidene chloride with other copolymerizable monomers, such as vinyl chloride, acrylonitrile, and alkyl acrylates, are well known. Emulsion polymerization techniques have been characterized by rapid polymerization rates but with many disadvantages, notably the multi-step complex recovery of the polymer produced. Suspension polymerization techniques provide a polymer which is readily isolatable from the polymerization medium and which is in a useful particulate form of relatively high density. Suspension polymerization techniques are, however, characterized by relatively slow rates of polymerization. It would be desirable in the polymerization of vinylidene chloride polymers, if the above-mentioned advantages of each of the emulsion and suspension techniques could be combined into a single polymerization process.

Accordingly, it is the principal object of this invention to provide a process for polymerizing monomeric mixtures composed of at least about 85 weight percent vinylidene chloride which would produce the readily isolatable high density polymer of the suspension system with a polymerization rate essentially equivalent to that of the emulsion system.

The above and related objects may be achieved by means of a process wherein an oil phase consisting of the monomeric material is dispersed in an aqueous phase consisting essentially of water, a specific water-soluble polymerization catalyst, certain cellulose ethers, certain wetting agents, and certain inorganic coagulating agents, in particular concentrations, and subjecting the dispersion to polymerization conditions.

The monomeric entity with which the present invention finds utility is that composed of at least about 85 weight percent vinylidene chloride with any remainder consisting of at least one monoethylenically unsaturated comonomer. This class of monomeric materials forms polymers which for a long time have been recognized as a natural genus of polymeric materials. The comonomers useful in the process are known to the skilled worker. Representative examples of such comonomers include vinyl chloride, vinyl acetate, acrylonitrile, alkyl acrylates and methacrylates, acrylic acid, methacrylic acid, and vinyl alkyl ethers. The use of two or more comonomers to form terpolymers or the like is also comprehended within the herein claimed process.

Although the amount of water used has little affect on the process, it is preferred to operate in the range of from 2 to 4 parts water per part of monomer. When less water is used, there is insufficient heat transfer to carry away the heat of polymerization.

The polymerization conditions, such as temperature, pH and agitation, are those conventionally employed in the polymerization of vinylidene chloride. Thus, the temperatures will usually fall in the range of from about 25° C. to about 65° C., although higher or lower temperatures may be used, and the polymerization will generally be initiated at a pH of 4 or below.

The catalysts contemplated for use in the present process are hydrogen peroxide or mixtures of hydrogen peroxide and iron. Such catalysts are used in amounts of from about 0.1 to about 5 weight percent based on the weight of the monomers. Within this range the catalyst concentration has no adverse effect on the advantages derivable from the process.

The cellulose ethers which are employed are water-soluble methyl celluloses and methyl hydroxypropyl celluloses. Any viscosity grade of these cellulose ethers may be used, although it is preferred to use the lower viscosity grades, such as 10 centipoises to about 400 centipoises. The lower viscosity grades of methyl cellulose and methyl hydroxypropyl cellulose are more easily dissolved in water than the higher viscosity grades. By viscosity grades, as herein used, is meant the viscosity of a 2 percent aqueous solution of the cellulose ether measured at 20° C.

The wetting agent used in this process may be selected from any of those ionic agents known to emulsify vinylidene chloride in water. As is well known in the art, the various ionic emulsifiers differ in their emulsifying action toward any given monomer. There are numerous references to which the researcher may turn to find operable emulsifiers for vinylidene chloride and the comonomers being used. Those emulsifiers selected from the anionic classification have been found to be most efficient and are preferred in carrying out the process. Particularly preferred anionic materials are the dihexyl ester of sodium sulfosuccinic acid and the sodium salts of condensed napthalene sulfonic acid.

The coagulants that have been found to be useful in the instant process are those water-soluble salts having a polyvalent metallic cation. By water-soluble is meant that the concentration of salt required in the process will dissolve in the amount of water used in the process at the temperature employed. Typical of the useful salts are calcium chloride, barium chloride, cadmium chloride, zinc chloride, magnesium chloride, aluminum chloride, aluminum chloride hexahydrate, aluminum sulfate, lead acetate, and strontium nitrate. Other water-soluble polyvalent metal salts will likewise work in the process to realize the stated objectives. It will be apparent to those skilled in the art that some polyvalent metal ions may exert an adverse effect on certain physical and chemical properties of haloethylene polymers. For example, copper ions and iron ions, when present in significant concentration in a haloethylene polymer formulation, are known to cause reduction in thermal and light stability of the polymer. The concentration of such ions that will remain from their use in the instant process, however, is very small and will not negate the operability of the process. Such metallic salts, although providing the desired advantages, will usually not be used when it is desired to prepare polymers that will find their way into end uses that involve prolonged exposure to heat and light.

The amounts of cellulose ether wetting agent and coagulant salt that may be used in the process may be varied within certain limits. Each of the substances may be employed in amounts of from about 0.1 weight percent to about 1 weight percent, based on the weight of the monomer phase. When no cellulose ether is employed, there is insufficient granulation and the resulting product of polymerization is either a latex or a precoagulum sometimes known as a button. Little advantage accrues from the use of more than about 1 weight percent and the properties of the resulting polymer may be affected by residual cellulose ether. When no wetting agent is used, the polymerization process becomes a suspension process with the usual low polymerization rates. When more than the indicated amount of wetting agent is employed, the tendency towards the formation of latexes is increased. When no coagulant salt is employed, the polymer is not formed in the desired particulate form. When greater than the indicated amounts are used, the residual salt is difficult to extract from the polymeric product. It should, therefore, be apparent that the process of this invention requires a balance of the prescribed agents to obtain the desired product. Simple preliminary experiments will inform the skilled worker as to the optimum amounts within the specified range of the particular agents with which he is working to produce the polymer having the optimum particle size distribution.

Although the order of addition of the various ingredients is not critical, it is preferred to prepare the complete aqueous phase including cellulose ether, emulsifier salt and catalyst and then to add the monomer phase. In preparing the aqueous phase, it has been found to be most convenient, although not critical, to solubilize the cellulose ether, then to add the wetting agent, then the coagulant, and finally the catalyst.

The process of this invention prepares a polymer in granular or bead form which is readily isolatable from the polymerization system by simple means, such as filtration. Washing with water will remove most of the residual components of the dispersant and the catalyst system. The polymer particles so formed are of high bulk density, comparing in this regard to the particles resulting from a suspension polymerization system. The rate of polymerization, however, is significantly increased and, in fact, approaches that polymerization rate generally obtained using an emulsion polymerization system.

The operation of the process and the advantages derivable therefrom will be illustrated by the following example wherein all parts and percentages are by weight.

EXAMPLE 1

Into an upright cylindrical polymerization vessel having a capacity of 50 gallons and equipped with a coaxial agitator and jacketed for heating and cooling was charged water in an amount of 2.5 times the amount of monomers to be used. The water was heated to about 25° C., after which 0.5 weight percent of the dihexyl ester of sodium sulfosuccinic acid was added. The mixture was agitated for 5 minutes and then 0.2 percent of 400 centipoise viscosity grade of methyl hydroxypropyl cellulose was incorporated. To that solution there was added 0.3 percent of calcium chloride, after which the pH was adjusted to 4.0. Hydrogen peroxide catalyst was then added in amount sufficient to provide about 1.0 weight percent based on the weight of the monomer. The system was closed and purged twice with nitrogen. Acrylonitrile and vinylidene chloride were drawn into the vessel, after which 40 parts per million of iron as ferric nitrate and vinyl chloride were added to form a monomer mix consisting of 85 weight percent vinylidene chloride, 5 weight percent acrylonitrile, and 10 weight percent vinyl chloride. The charge was agitated for 20 minutes and then heated to 50° C. The polymerization was run to a 10 pound per square inch gauge pressure drop from the maximum, after which it was cooled, vented, and evacuated for 1 hour. The mix was centrifuged, washed with water, and dried. The resulting polymer was in the form of filterable granules of uniform particle size distribution. The particles readily absorbed plasticizers and other additives and, when so formulated, were found to feed well without agglomeration or other troubles in gravity feed devices, such as hoppers. The molecular weight of the polymer so produced was somewhat lower than the polymer of the same monomeric composition prepared by emulsion polymerization techniques. This polymer and process is hereafter identified as sample 1.

Similar desirable results were obtained using the sodium salt of condensed napthalene sulfonic acid as a replacement for the dihexyl ester of sodium sulfosuccinic acid or aluminum chloride hexahydrate as a replacement for the calcium chloride coagulant, or by using a monomer mix consisting of 90 weight percent vinylidene chloride and 10 weight percent acrylonitrile.

By way of comparison, it was unexpectedly found that in each of a series of experiments conducted essentially as specifically described herein (sample 1), but utilizing monomer mixtures consisting of from 68 to 80 weight percent vinylidene chloride and from 32 to 20 weight percent vinyl chloride, that the resulting polymer in each instance was in the form of undesirable "balls" having a diameter of from about one-eighth to one-fourth inch in diameter.

Further by way of comparison, it was unexpectedly found that in an experiment conducted essentially as described herein (sample 1), but wherein the hydrogen peroxide catalyst was replaced with a catalyst consisting of 0.3 weight percent $K_2S_2O_8$ and 0.3 weight percent $NaHSO_3$; a polymer latex system was formed, i.e., where there was no phase separation of the polymer particles.

EXAMPLE 2

In each of a series of experiments, individual polymerizations were carried out in separate standard glass citrate bottles utilizing loading procedures essentially as described in Example 1. These experiments were designed to compare the process of this invention with prior known emulsion and suspension type polymerizations. In all instances, the monomer composition employed consisted of a mixture of 85 weight percent vinylidene chloride, 5 weight percent acrylonitrile and 10 weight percent vinyl chloride. The following Table I illustrates the amounts and types of cellulose ethers, wetting agents, catalysts and coagulants used; the reaction conditions employed and the per cent conversion of monomer to polymer. In such table, comparative runs 1 and 2 represent typical emulsion polymerizations, comparative runs 3, 4, and 5 represent typical suspension polymerizations; comparative runs 6, 7, and 8 represent modified suspension polymerizations using an oil soluble catalyst and low concentrations of wetting agent and coagulant; and runs 9 and 10 illustrate the process of the present invention:

TABLE I

| Run No. | Wetting agent | 400 cps. methyl hydroxypropyl cellulose | Catalyst | Coagulant | Polymerization conditions (hrs. at 60° C.) | Percent conversion monomer to polymer |
| --- | --- | --- | --- | --- | --- | --- |
| For comparison: | | | | | | |
| 1 | Dihexylester of sodium sulfosuccinic acid (1.0 wgt. percent). | None | $H_2O_2$ (1.0 wgt. percent) | None | 7 | 40.5 |
| 2 | do | None | do | do | 24 | 99.8 |
| 3 | None | 0.3 | $Lr_2O_2$ | do | 7 | 9.1 |
| 4 | do | 0.3 | (0.3 wgt. percent). | do | 24 | 30.5 |
| 5 | do | 0.3 | do | do | 48 | 49.8 |
| 6 | Sodium lauryl sulfonate (0.5 wgt. percent). | 0.15 | do | $CaCl_2$ (0.15 wgt. percent). | 7 | 10.2 |
| 7 | do | 0.15 | do | do | 24 | 30.2 |
| 8 | do | 0.15 | do | do | 48 | 55.9 |
| This invention: | | | | | | |
| 9 | Sodium salt of condensed napthalene sulfonic acid (0.3 wgt. percent). | 0.2 | $H_2O_2$ (1.0 wgt. percent) plus 10 p.p.m. $Fe^{+++}$. | $AlCl_3.6H_2O$ (0.7 wgt. percent). | 7 | 23.7 |
| 10 | do | 0.2 | do | do | 24 | 97.6 |

The data presented in Table I illustrate that utilization of the process of this invention (runs 9 and 10) provides a polymerization rate essentially equivalent to that obtained in a typical emulsion polymerization (comparative runs 1 and 2), and is significantly greater than that obtained in a typical suspension polymerization (comparative runs 3, 4, and 5) or in the illustrated modified suspension polymerization (runs 6, 7, and 8).

Further, utilization of the process of this invention provides for the formation of a particulate, high density polymer particles which is easily isolated from the reaction media without the disadvantage of the complex recovery procedures required for similar polymers prepared by emulsion techniques.

Similar good results as specifically illustrated herein (Examples 1 and 2) are obtained when monomeric mixtures composed of at least about 85 percent vinylidene chloride with the remainder of monoethylenically unsaturated comonomers are polymerized by the prescribed procedure, utilizing either continuous or batch polymerization techniques.

What is claimed is:

1. A process for polymerizing a monomeric material composed of at least 85 percent by weight of vinylidene chloride with any remainder being at least one monoethylenically unsaturated comonomer selected from the group consisting of vinyl chloride, vinyl acetate, acrylonitrile, alkyl acrylates and methacrylates, acrylic acid, methacrylic acid and vinyl alkyl ethers, said process comprising the sequential steps of (1) dispersing said monomeric material in an aqueous phase consisting essentially of (a) from 2 to 4 parts by weight of water per part of monomer, (b) from 0.1 to 1 weight percent of said monomeric material of a water-soluble methyl hydroxy-propyl cellulose having a viscosity of about 400 centipoise, (c) from 0.1 to 1 weight percent of said monomeric material of an anionic emulsifying agent selected from the group consisting of the dihexyl ester of sodium sulfosuccinic acid and the sodium salt of condensed naphthalene sulfonic acid, (d) from 0.1 to 1 weight percent of said monomeric material of a water-soluble metal salt selected from the group consisting of calcium chloride, barium chloride, cadmium chloride, zinc chloride, magnesium chloride, aluminum chloride, aluminum chloride hexahydrate, aluminum sulfate, lead acetate and strontium nitrate, wherein the metal cation has a valence greater than one and (e) from 0.5 to 5 weight percent of said monomeric material of a catalyst selected from the group consisting of hydrogen peroxide and mixtures of hydrogen peroxide and iron and (2) maintaining dispersion of the polymerizing particles with agitation at a pH of about 4.0 and below at a temperature of from about 25° to about 65° C. until polymerization is substantially complete.

2. The process of claim 1 wherein said monomeric material is composed of 85 weight percent vinylidene chloride, 5 weight percent acrylonitrile, and 10 weight percent vinyl chloride.

3. The process of claim 1 wherein said monomeric material is composed of 90 weight percent vinylidene chloride and 10 weight percent acrylonitrile.

* * * * *